(12) United States Patent
Nakamura et al.

(10) Patent No.: US 11,989,954 B2
(45) Date of Patent: May 21, 2024

(54) OCCUPANT STATE DETECTION SYSTEM

(71) Applicant: SUBARU CORPORATION, Tokyo (JP)

(72) Inventors: Ryota Nakamura, Tokyo (JP); Tsukasa Mikuni, Tokyo (JP); Takuya Homma, Tokyo (JP); Yutaka Ishii, Tokyo (JP); Masatoshi Tsuge, Tokyo (JP); Kazuhiro Hayakawa, Tokyo (JP); Toru Kato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/698,624

(22) Filed: Mar. 18, 2022

(65) Prior Publication Data
US 2022/0319202 A1 Oct. 6, 2022

(30) Foreign Application Priority Data
Mar. 30, 2021 (JP) ................................ 2021-058861

(51) Int. Cl.
*G06V 20/59* (2022.01)
*B60W 40/08* (2012.01)
*G06V 40/16* (2022.01)

(52) U.S. Cl.
CPC ........... *G06V 20/597* (2022.01); *B60W 40/08* (2013.01); *G06V 40/172* (2022.01); *B60W 2040/0827* (2013.01); *B60W 2040/0872* (2013.01); *B60W 2420/403* (2013.01); *B60W 2420/408* (2024.01); *B60W 2540/043* (2020.02); *B60W 2540/221* (2020.02); *B60W 2540/223* (2020.02); *B60W 2540/229* (2020.02)

(58) Field of Classification Search
None
See application file for complete search history.

(56) References Cited

U.S. PATENT DOCUMENTS

| | | | |
|---|---|---|---|
| 2019/0362167 A1 | 11/2019 | Nakamura et al. | |
| 2020/0334453 A1* | 10/2020 | Thomas | B60R 21/01512 |
| 2020/0383580 A1* | 12/2020 | Shouldice | B60W 50/14 |

FOREIGN PATENT DOCUMENTS

JP 2019-202726 A 11/2019

* cited by examiner

*Primary Examiner* — Thomas S Mccormack
(74) *Attorney, Agent, or Firm* — Rimon P.C.

(57) ABSTRACT

An occupant state detection system includes first and second occupant monitoring apparatuses, a determination apparatus, and an occupant state detection apparatus. The first and second occupant monitoring apparatuses monitor a physical state of an occupant in a vehicle in different methods. The occupant state detection apparatus includes one or more first processors and one or more first memories. Upon receiving data indicating that the vehicle is in a stopped state from the determination apparatus, the one or more first processors cooperate with one or more programs in the one or more first memories to: make assignment of a part to be monitored and data to be acquired, of the occupant in the vehicle, to be detected by the first and second occupant monitoring apparatuses; and detect the physical state of the occupant on the basis of first and second occupant monitoring data from the first and second occupant monitoring apparatuses.

3 Claims, 13 Drawing Sheets

|  | FIRST OCCUPANT MONITORING DATA | SECOND OCCUPANT MONITORING DATA |
|---|---|---|
| HEART RATE |  | ○ |
| HEART RATE VARIABLITY |  | ○ |
| RESPIRATION RATE |  | ○ |
| BRAIN WAVE |  | ○ |
| POSTURE | ○ |  |
| NUMBER OF BLINKS | ○ |  |
| EYE APERTURE | ○ |  |
| SLEEPING TIME | ○ |  |
| NUMBER OF TIMES OCCUPANT TURNS OVER IN THEIR SLEEP | ○ |  |
| SLEEPING STATE | ○ |  |
| RESTING TIME | ○ |  |

FIG. 2

| OPERATION ANGLE \ DRIVER | A | B | C | D |
|---|---|---|---|---|
| 90 DEGREES | | | | |
| 100 DEGREES | | | | |
| 110 DEGREES | ○ | | | |
| 120 DEGREES | ○ | ○ | | |
| 130 DEGREES | | ○ | ○ | |
| 140 DEGREES | ○ | | ○ | |
| 150 DEGREES | | ○ | ○ | ○ |
| 160 DEGREES | | ○ | ○ | ○ |
| 170 DEGREES | | | | ○ |

FIG. 9

OCCUPANT STATE DETECTION SYSTEM

CROSS-REFERENCE TO RELATED APPLICATIONS

This application claims priority from Japanese Patent Application No. 2021-058861 filed on Mar. 30, 2021, the entire contents of which are hereby incorporated by reference.

BACKGROUND

The technology relates to an occupant state detection system.

In recent years, advance has been made in developments of so-called driver monitoring systems (DMS). Driver monitoring systems monitor a driver's state for purposes of assistance with safe driving of vehicles. For example, such a driver monitoring system detects where a driver is gazing at. In a case where the driver is not aware of a current situation, the driver monitoring system gives an alarm to the driver.

Examples of this kind of apparatus include an occupant monitoring apparatus that monitors occupants including a driver. This occupant monitoring apparatus makes it possible to reduce the number of imaging devices to be used, even in a case with an increase in the number of the occupants to be monitored. For example, reference is made to Japanese Unexamined Patent Application Publication (JP-A) No. 2019-202726.

SUMMARY

An aspect of the technology provides an occupant state monitoring system including a first occupant monitoring apparatus, a second occupant monitoring apparatus, a determination apparatus, and an occupant state detection apparatus. The first occupant monitoring apparatus is configured to monitor a physical state of an occupant in a vehicle. The second occupant monitoring apparatus is configured to monitor the physical state of the occupant in the vehicle in a different method from the first occupant monitoring apparatus. The determination apparatus is configured to determine whether the vehicle is in a traveling state or a stopped state. The occupant state detection apparatus is configured to detect the physical state of the occupant in the vehicle on the basis of first occupant monitoring data from the first occupant monitoring apparatus and second occupant monitoring data from the second occupant monitoring apparatus. The occupant state detection apparatus includes one or more first processors, and one or more first memories configured to be communicably coupled to the one or more first processors. Upon receiving data indicating that the vehicle is in the stopped state from the determination apparatus, the one or more first processors are configured to cooperate with one or more programs included in the one or more first memories to: make assignment of a part to be monitored and data to be acquired, of the occupant in the vehicle, to be detected by the first occupant monitoring apparatus and the second occupant monitoring apparatus; receive the first occupant monitoring data from the first occupant monitoring apparatus and the second occupant monitoring data from the second occupant monitoring apparatus; store the received first occupant monitoring data and the received second occupant monitoring data in the one or more first memories; and detect the physical state of the occupant on the basis of the first occupant monitoring data from the first occupant monitoring apparatus and the second occupant monitoring data from the second occupant monitoring apparatus held in the one or more first memories.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

FIG. 2 summarizes relation of first occupant monitoring data and second occupant monitoring data, in the occupant state detection system according to the first embodiment of the disclosure.

FIG. 9 summarizes history of an operation angle of a seatback of a vehicle, for each occupant at rest, held in a second memory in the occupant state detection system according to the second embodiment of the disclosure.

DETAILED DESCRIPTION

Figure 1:
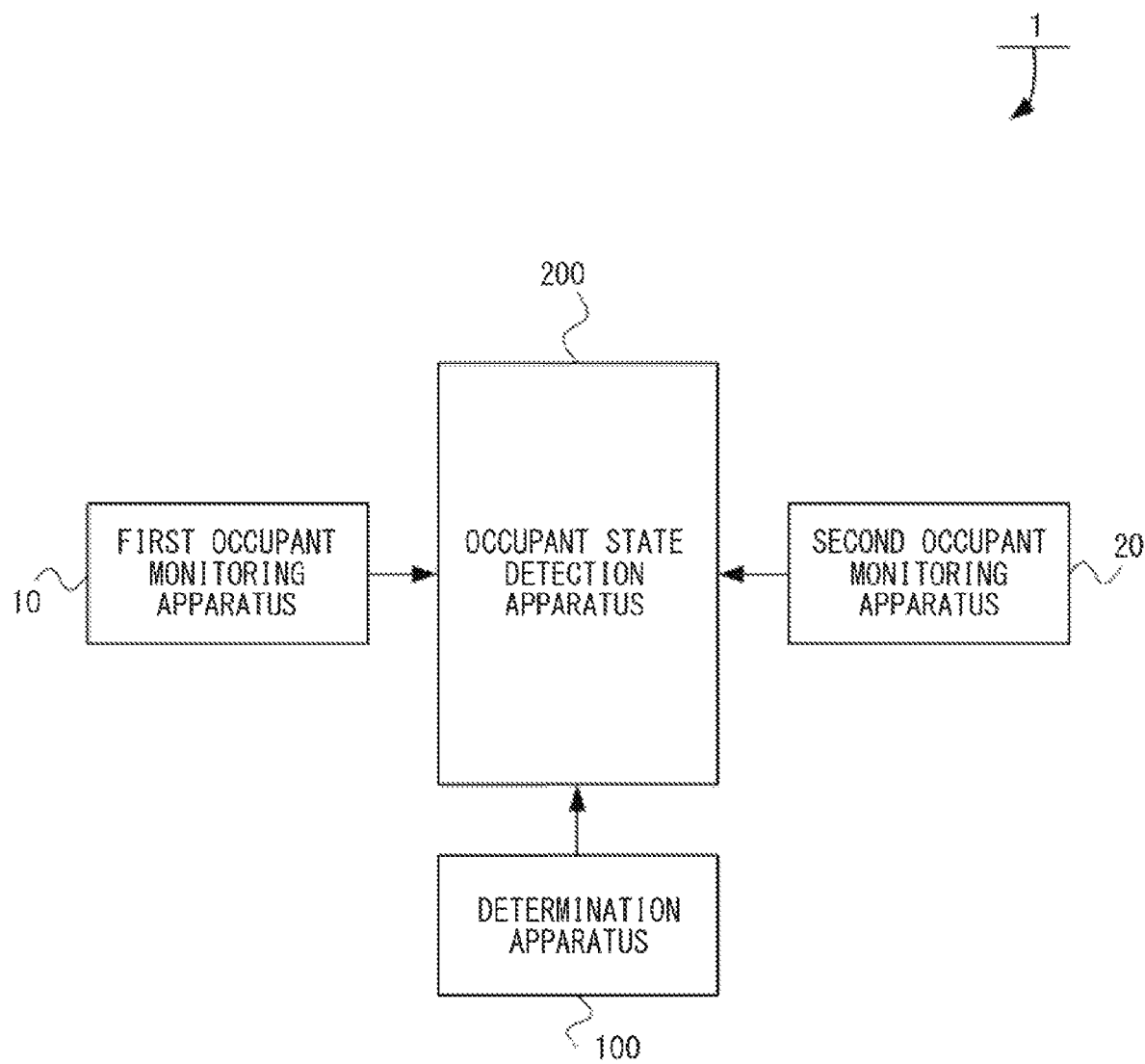
FIG. 1 is a block diagram illustrating a configuration of an occupant state detection system according to a first embodiment of the disclosure.

Existing techniques as disclosed in JP-A No. 2019-202726 are intended for monitoring occupants of a vehicle while the vehicle is in a traveling state. The existing techniques do not include monitoring occupants of a vehicle to determine, for example, physical states of the occupants while the vehicle is in a stopped state. Note that the occupants of a vehicle include a driver of the vehicle, and this also applies to the following.

Monitoring occupants of a vehicle sometimes involves using an imaging device. However, some occupants are hidden by, for example, objects installed in a cabin, and others are seated outside an angle of view of the imaging device. This hinders accurate detection of, for example, the physical states of the occupants.

Furthermore, in a case where a vehicle is in the stopped state, seated states of occupants are not uniquely determined. For example, some occupants recline their seatbacks to take a rest, and others move to a rear seat to take a rest. This hinders the accurate detection of, for example, the physical states of the occupants.

It is desirable to provide an occupant state detection system that makes it possible to detect accurately a state, e.g., a physical state, of an occupant including a driver, in a stopped state of a vehicle.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

The example embodiments of the technology are described below with reference to FIGS. 1 to 13.

First Embodiment

An occupant state detection system 1 according to a first embodiment is described with reference to FIGS. 1 to 4.
<Configuration of Occupant State Detection System 1>

As illustrated in FIG. 1, the occupant state detection system 1 according to this embodiment may include, without limitation, a first occupant monitoring apparatus 10, a second occupant monitoring apparatus 20, a determination apparatus 100, and an occupant state detection apparatus 200.

The first occupant monitoring apparatus 10 is configured to monitor, for example, a physical state of an occupant in the vehicle with the use of a camera. The camera may incorporate, for example, an imaging element such as a CCD (Charge Coupled Device) or a CIS (CMOS Image Sensor), and acquire an image of an occupant in the vehicle captured by the imaging element. The image of an occupant in the vehicle may include a moving image and a still image.

The camera of the first occupant monitoring apparatus 10 may be a dedicated camera. In one example, in a case where the occupant state detection system 1 includes an occupant recognition apparatus, a camera in the occupant recognition apparatus may serve as the camera of the first occupant monitoring apparatus 10.

In the occupant state detection system 1 according to this embodiment, the first occupant monitoring apparatus 10 is configured to monitor externally observable data such as expression, a posture, and behavior of an occupant.

The second occupant monitoring apparatus 20 is configured to monitor, for example, the physical state of the occupant in the vehicle with the use of millimeter-wave radar. The millimeter-wave data is configured to make, for example, detection of an object, and measurement of a distance to the detected object, a horizontal angle of the object, and a relative speed of the object, with radio waves of short wavelengths.

The second occupant monitoring apparatus 20 may be rather spaced away from the first occupant monitoring apparatus 10. This makes it possible to detect an occupant in the vehicle even in a case where the first occupant monitoring apparatus 10 fails to acquire an image of the occupant in the vehicle because of an obstacle.

In the occupant state detection system 1 according to this embodiment, the second occupant monitoring apparatus 20 is configured to obtain biological data such as heartbeat and respiration. Such biological data is difficult to observe from outside.

As summarized in FIG. 2, non-limiting examples of data to be obtained mainly from the first occupant monitoring apparatus 10 may include the posture of an occupant in the vehicle, facial expression such as an eye aperture and the number of blinks, sleeping time, resting time, and the number of times an occupant turns over in their sleep. Non-limiting examples of data to be obtained from the second occupant monitoring apparatus 20 may include a heart rate, a brain wave, heart rate variability, and a respiration rate.

For example, the eye aperture serves as an indication of detection of an occupant dozing. The number of blinks serves as an indication of detection of a degree of asthenopia. The number of times an occupant turns over in their sleep, and a sleeping state such as REM (rapid eye movement) sleep and non-REM sleep serve as an indication of the sleeping state including quality of sleep.

The determination apparatus 100 is configured to determine whether the vehicle is in a traveling state or a stopped state. For example, the determination apparatus 100 may acquire ignition data. On the basis of the ignition data, in a case where ignition is in an OFF state, the determination apparatus 100 may transmit data indicating that the vehicle is in a stopped state, to the occupant state detection apparatus 200. On the basis of the ignition data, in a case where the ignition is in an ON state, the determination apparatus 100 may transmit data indicating that the vehicle is in a traveling state, to the occupant state detection apparatus 200.

The determination apparatus 100 may further monitor, for example, a vehicle speed pulse and an operation state of a parking brake. On the basis of the vehicle speed pulse and the operation state of the parking brake together with the ON and OFF states of the ignition, the determination apparatus 100 may determine whether the vehicle is in the traveling state or the stopping state.

The occupant state detection apparatus 200 is configured to make assignment of a part to be monitored and data to be acquired, of an occupant in the vehicle, to be detected by the first occupant monitoring apparatus 10 and the second occupant monitoring apparatus 20 in a case where the occupant state detection apparatus 200 has received, from the determination apparatus 100, the data indicating that the vehicle is in the stopped state.

The occupant state detection apparatus 200 is configured to receive first occupant monitoring data from the first occupant monitoring apparatus 10 and second occupant monitoring data from the second occupant monitoring apparatus 20.

On the basis of the first occupant monitoring data from the first occupant monitoring apparatus 10 and the second occupant monitoring data from the second occupant monitoring apparatus 20, the occupant state detection apparatus 200 is configured to detect, for example, the physical state of the occupant.

<Configuration of Occupant State Detection Apparatus 200>

Figure 3:
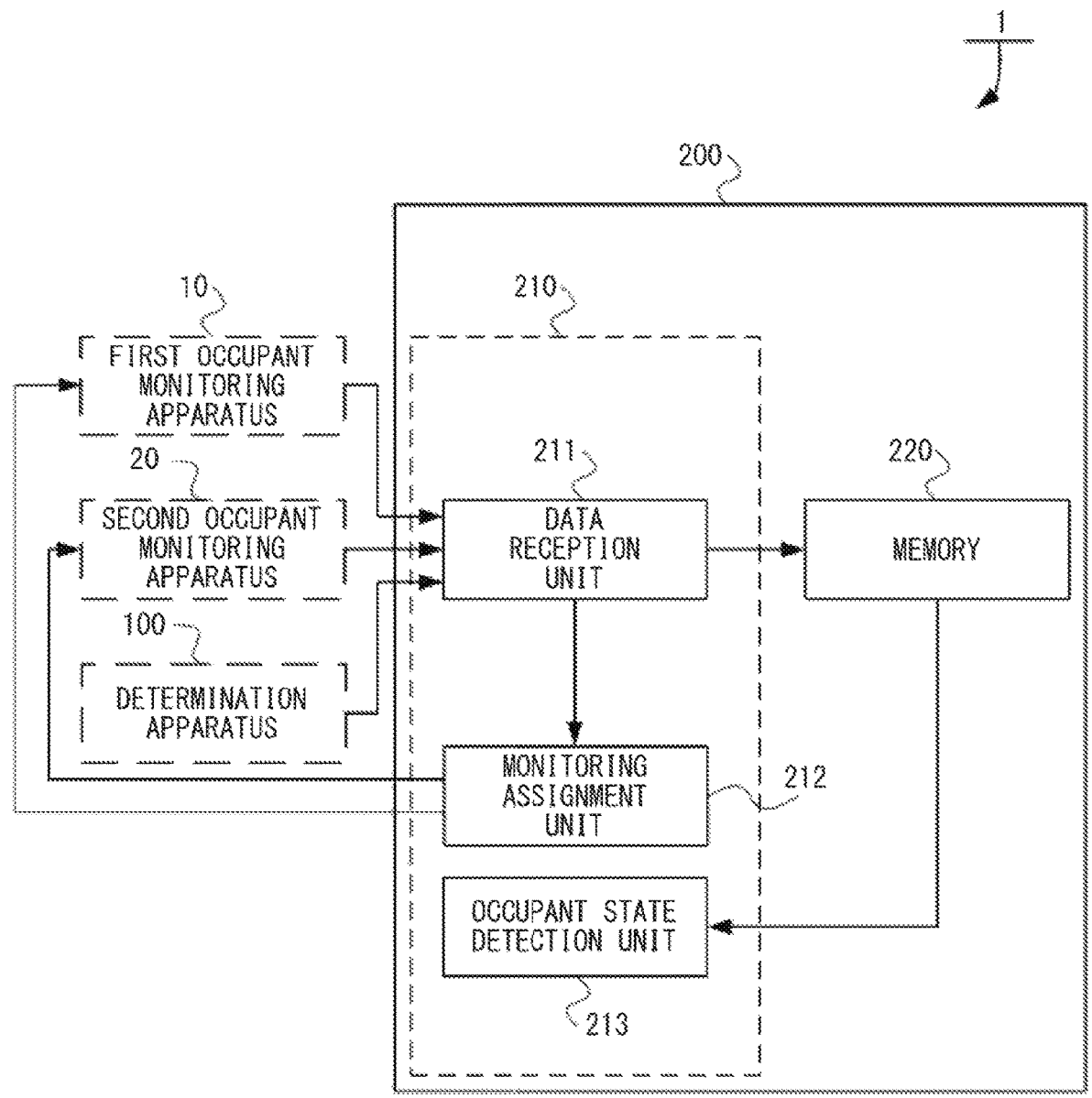
FIG. 3 is a block diagram illustrating a configuration of an occupant state detection apparatus in the occupant state detection system according to the first embodiment of the disclosure.

As illustrated in FIG. 3, the occupant state detection apparatus 200 according to this embodiment may include, without limitation, a first processor 210 and a first memory 220.

The first processor 210 is configured to cooperate with one or more control programs included in the first memory 220 described later, to control an entirety of the occupant state detection apparatus 200.

In this embodiment, for example, the first processor 210 is configured to serve as, for example, a data reception unit 211, a monitoring assignment unit 212, and an occupant state detection unit 213 described later.

The first memory 220 may include, without limitation, a ROM (Read Only Memory) and/or a RAM (Random Access Memory). The ROM may hold, for example, the control program as mentioned above. The RAM may hold, for example, various data.

In this embodiment, for example, the first occupant monitoring data from the first occupant monitoring apparatus 10 and the second occupant monitoring data from the second occupant monitoring apparatus 20 may be held in the RAM.

<Configuration of First Processor 210>

As illustrated in FIG. 3, the first processor 210 according to this embodiment may include, without limitation, the data reception unit 211, the monitoring assignment unit 212, and the occupant state detection unit 213.

The data reception unit 211 may receive, from the determination apparatus 100, the data indicating that the vehicle is in the traveling state, or the data indicating that the vehicle is in the stopped state.

At least in a case where the data reception unit 211 receives the data indicating that the vehicle is in the stopped state from the determination apparatus 100, the data reception unit 211 may transmit the relevant data to the monitoring assignment unit 212 described later.

Moreover, the data reception unit 211 may receive the first occupant monitoring data from the first occupant monitoring apparatus 10 and the second occupant monitoring data from the second occupant monitoring apparatus 20. The first occupant monitoring apparatus 10 and the second occupant monitoring apparatus 20 are provided, by the monitoring assignment unit 212 described later, with the assignment of the part to be monitored and the data to be acquired, of the occupant in the vehicle, to be detected by the first occupant monitoring apparatus 10 and the second occupant monitoring apparatus 20.

The data reception unit 211 may store the first occupant monitoring data received from the first occupant monitoring apparatus 10 and the second occupant monitoring data received from the second occupant monitoring apparatus 20, in the RAM in the first memory 220.

The monitoring assignment unit 212 may make the assignment of, for example, the part to be monitored and the data to be acquired, of the occupant in the vehicle, to be detected by the first occupant monitoring apparatus 10 and the second occupant monitoring apparatus 20, in the case where the monitoring assignment unit 212 receives, from the data reception unit 211, the data indicating that the vehicle is in the stopped state.

In one example, the monitoring assignment unit 212 may assign "face" to the part to be monitored by the first occupant monitoring apparatus 10, and assign "expression and change in expression" to the data to be acquired as a parameter by the first occupant monitoring apparatus 10.

For example, the monitoring assignment unit 212 may assign "whole body" to the part to be monitored by the first occupant monitoring apparatus 10, and assign "behavior" to the data to be acquired as the parameter by the first occupant monitoring apparatus 10.

For example, the monitoring assignment unit 212 may assign "neck" to the part to be monitored by the second occupant monitoring apparatus 20, and assign "pulse" to the data to be acquired as the parameter by the second occupant monitoring apparatus 20.

For example, the monitoring assignment unit 212 may assign "head" to the part to be monitored by the second occupant monitoring apparatus 20, and assign "brain wave" to the data to be acquired as the parameter by the second occupant monitoring apparatus 20.

The occupant state detection unit 213 is configured to detect, for example, the physical state of the occupant on the basis of the first occupant monitoring data from the first occupant monitoring apparatus 10 and the second occupant monitoring data from the second occupant monitoring apparatus 20 held in the first memory 220.

In one example, the occupant state detection unit 213 may detect, for example, a fatigue state of the occupant in the vehicle on the basis of the first occupant monitoring data to be obtained from the first occupant monitoring apparatus 10, e.g., the facial expression such as the eye aperture and the number of blinks, the posture, and the behavior such as the sleeping time, the resting time, and the number of times an occupant turns over during their sleep.

The occupant state detection unit 213 may further detect, for example, a mental fatigue state and a health state of the occupant in the vehicle on the basis of the second occupant monitoring data to be obtained by the second occupant monitoring apparatus 20, e.g., the pulse and the heartbeat.

<Processing in Occupant State Detection System 1>

Figure 4:
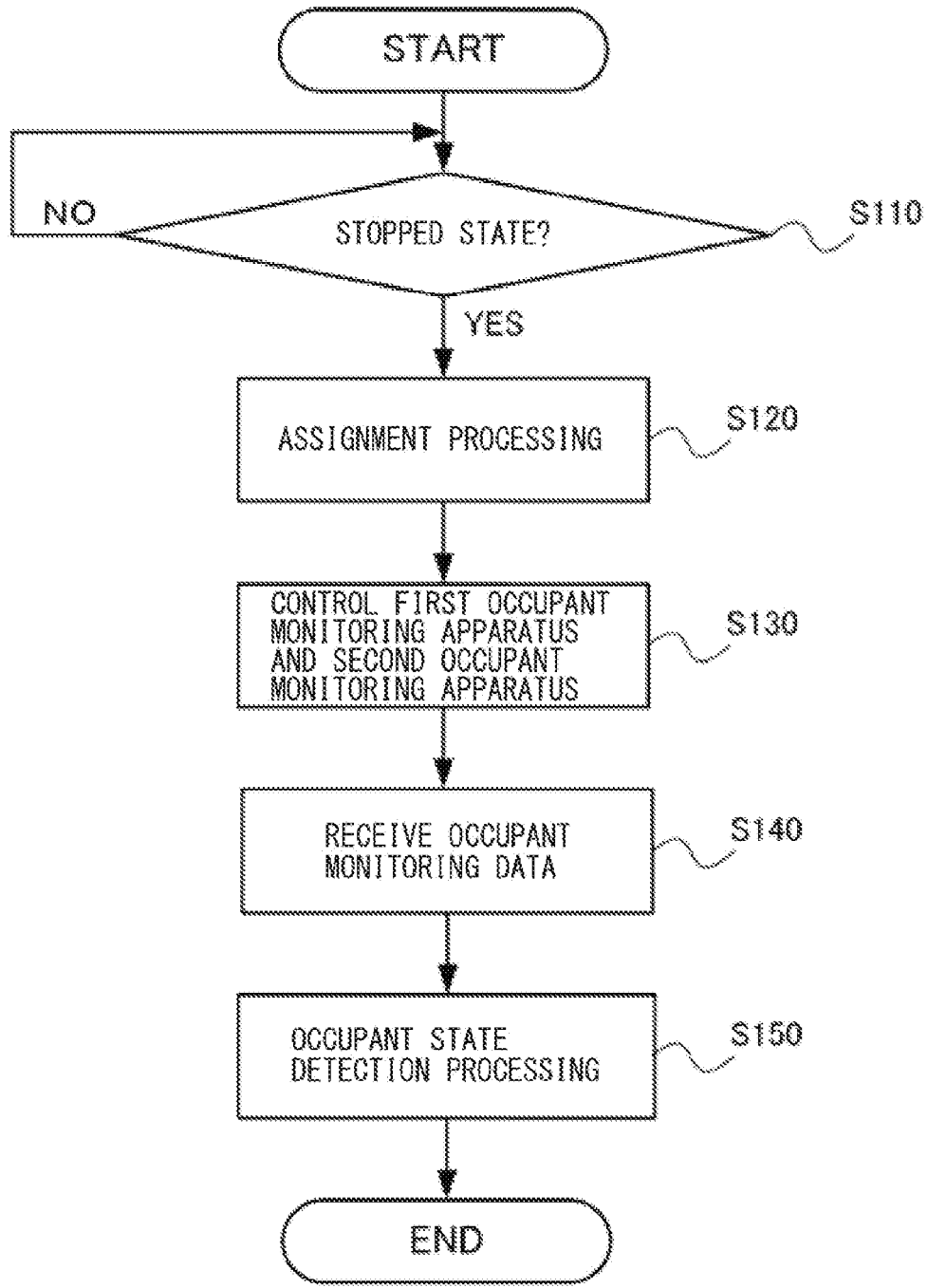
FIG. 4 is a flowchart of processing in the occupant state detection system according to the first embodiment of the disclosure.

Processing in the occupant state detection system 1 according to this embodiment is described with reference to FIG. 4.

The monitoring assignment unit 212 of the first processor 210 may determine whether or not the monitoring assignment unit 212 has received the data indicating that the vehicle is in the stopped state, or that the ignition is in the OFF state, from the determination apparatus 100 through the data reception unit 211 (step S110).

In a case where the monitoring assignment unit 212 determines that the monitoring assignment unit 212 has not received the data indicating that the vehicle is in the stopped state, or that the ignition is in the OFF state ("NO" in step S110), the monitoring assignment unit 212 may cause the processing to return to step S110 and shift to a standby state.

In a case where the monitoring assignment unit 212 determines that the monitoring assignment unit 212 has received the data indicating that the vehicle is in the stopped state, or that the ignition is in the OFF state ("YES" in step S110), the monitoring assignment unit 212 may cause the flow to proceed to assignment processing (step S120).

In the assignment processing (step S120), the monitoring assignment unit 212 may perform processing of making the assignment of the part to be monitored and the data to be acquired, of the occupant in the vehicle, to be detected by the first occupant monitoring apparatus 10 and the second occupant monitoring apparatus 20, and transmitting a signal of such assignment to the first occupant monitoring apparatus 10 and the second occupant monitoring apparatus 20.

After the assignment processing (step S120) in the monitoring assignment unit 212 is carried out, the first processor 210 may permit the first occupant monitoring apparatus 10 and the second occupant monitoring apparatus 20 that have been already started up to output data to the data reception unit 211.

Alternatively, after the assignment processing (step S120) in the monitoring assignment unit 212 is carried out, the first processor 210 may permit the data reception unit 211 to receive the first occupant monitoring data from the first occupant monitoring apparatus 10 and the second occupant monitoring data from the second occupant monitoring apparatus 20.

In another alternative, after the assignment processing (step S120) in the monitoring assignment unit 212 is carried out, the first processor 210 may permit the data reception unit 211 to write, to the first memory 220, the first occupant monitoring data from the first occupant monitoring apparatus 10 and the second occupant monitoring data from the second occupant monitoring apparatus 20.

The data reception unit 211 may receive the first occupant monitoring data from the first occupant monitoring apparatus 10 and the second occupant monitoring data from the second occupant monitoring apparatus 20 (step S140). The first occupant monitoring apparatus 10 and the second occupant monitoring apparatus 20 are provided, by the monitoring assignment unit 212, with the assignment of the part to be monitored and the data to be acquired, of the occupant in the vehicle, to be detected by the first occupant monitoring apparatus 10 and the second occupant monitoring apparatus 20.

The data reception unit 211 may store the first occupant monitoring data received from the first occupant monitoring apparatus 10 and the second occupant monitoring data from the second occupant monitoring apparatus 20, in the first memory 220.

The occupant state detection unit 213 may detect, for example, the physical state of the occupant on the basis of the first occupant monitoring data from the first occupant monitoring apparatus 10 and the second occupant monitoring data from the second occupant monitoring apparatus 20 held in the first memory 220 (step S150).

<Workings and Effects>

As described above, the occupant state detection system 1 according to this embodiment includes the first occupant monitoring apparatus 10, the second occupant monitoring apparatus 20, the determination apparatus 100, and the occupant state detection apparatus 200. The first occupant monitoring apparatus 10 is configured to monitor the physical state of the occupant in the vehicle. The second occupant monitoring apparatus 20 is configured to monitor the physical state of the occupant in the vehicle in a different method from the first occupant monitoring apparatus 10. The determination apparatus 100 is configured to determine whether the vehicle is in the traveling state or the stopped state. The occupant state detection apparatus 200 is configured to detect the physical state of the occupant in the vehicle on the basis of the first occupant monitoring data from the first occupant monitoring apparatus 10 and the second occupant monitoring data from the second occupant monitoring apparatus 20. The occupant state detection apparatus 200 includes the one or more first processors 210 and the one or more first memories 220. The one or more first memories 220 is configured to be communicably coupled to the one or more first processors 210. Upon receiving the data indicating that the vehicle is in the stopped state from the determination apparatus 100, the one or more first processors 210 are configured to cooperate with one or more programs included in the one or more first memories 220 to: make the assignment of the part to be monitored and the data to be acquired, of the occupant in the vehicle, to be detected by the first occupant monitoring apparatus 10 and the second occupant monitoring apparatus 20; receive the first occupant monitoring data from the first occupant monitoring apparatus 10 and the second occupant monitoring data from the second occupant monitoring apparatus 20; store the received first occupant monitoring data and the received second occupant monitoring data, in the one or more first memories 220; and detect the physical state of the occupant on the basis of the first occupant monitoring data from the first occupant monitoring apparatus 10 and the second occupant monitoring data from the second occupant monitoring apparatus 20 held in the one or more first memories 220.

That is, in the case where the vehicle is in the stopped state, the state of the occupant in the vehicle is detected with the use of the first occupant monitoring apparatus 10 and the second occupant monitoring apparatus 20. The first occupant monitoring apparatus 10 and the second occupant monitoring apparatus 20 are provided with the assignment of the part to be monitored and the data to be acquired, of the occupant in the vehicle.

This leads to mutual complementation of the first occupant monitoring apparatus 10 and the second occupant monitoring apparatus 20 in the detection of the state of the occupant in the case where the vehicle is in the stopped state. Hence, it is possible to accurately detect the physical state of the occupant in the stopped state of the vehicle.

Moreover, in the occupant state detection system 1 according to this embodiment, the determination apparatus 100 may acquire the ignition data. In a case where the ignition is in the OFF state, the determination apparatus 100 may transmit the data indicating that the vehicle is in the stopped state, to the one or more first processors 210.

For example, the determination apparatus 100 may include an ignition key. In a case where the ignition key is at an OFF position, the determination apparatus 100 may transmit the data indicating that the vehicle is in the stopped state, to the one or more first processor 210.

In other words, the determination apparatus 100 may determine whether the vehicle is in the traveling state or the stopped state on the basis of whether the ignition is in the ON state or the OFF state, i.e., whether the ignition key is at an ON position or the OFF position.

Hence, in the occupant state detection system 1, it is possible to determine uniquely whether the vehicle is in the traveling state or the stopped state, without using a special sensor, etc.

Furthermore, in the occupant state detection system 1 according to this embodiment, the first occupant monitoring apparatus 10 may include the camera configured to capture the image of the occupant in the vehicle. The first occupant monitoring apparatus 10 may acquire the first occupant monitoring data including the behavior, the expression, and the posture of the occupant in the vehicle, and transmit the first occupant monitoring data to the one or more first processors 210.

That is, in the occupant state detection system 1, the first occupant monitoring apparatus 10 is allowed to acquire the first occupant monitoring data in consideration of characteristics of the built-in camera, to detect the state of the occupant. The first occupant monitoring data includes the behavior, the expression, and the posture of the occupant in the vehicle.

This makes it possible for the occupant state detection system 1 to obtain highly accurate data regarding, for example, the behavior, the expression, and the posture of the occupant in the vehicle. Hence, it is possible to enhance accuracy of the detection of the physical state of the occupant in the vehicle in the stopped state of the vehicle.

Hence, it is possible to grasp accurately the state of the occupant in the stopped state of the vehicle at any time.

Furthermore, in the stopped state of the vehicle, there is little influence by road noise. Hence, it is possible to enhance the accuracy of the detection in the stopped state of the vehicle, as compared to the traveling state of the vehicle.

In addition, in the occupant state detection system 1 according to this embodiment, the second occupant monitoring apparatus 20 may include the millimeter-wave radar. The second occupant monitoring apparatus 20 may acquire the biological data including the heartbeat and the brain wave of the occupant in the vehicle, and transmit the biological data to the one or more first processors 210.

That is, in the occupant state detection system 1, the second occupant monitoring apparatus 20 is allowed to acquire the second occupant monitoring data in consideration of characteristics of the built-in millimeter-wave radar, to detect the state of the occupant. The second occupant monitoring data includes the biological data including the heartbeat and the brain wave of the occupant in the vehicle.

This makes it possible for the occupant state detection system 1 to obtain highly accurate data regarding the biological data including the heartbeat and the brain wave of the occupant in the vehicle. Hence, it is possible to enhance the accuracy of the detection of the physical state of the occupant in the vehicle in the stopped state of the vehicle.

Moreover, the millimeter-wave radar exhibits stable performance day and night. Hence, it is possible to grasp accurately the physical state of the occupant in the stopped state of the vehicle at any time.

Furthermore, in the stopped state of the vehicle, there is little influence by road noise. Hence, it is possible to enhance the accuracy of the detection in the stopped state of the vehicle, as compared to the traveling state of the vehicle.

Second Embodiment

An occupant state detection system 1A according to a second embodiment is described with reference to FIGS. 5 to 9.

<Configuration of Occupant State Detection System 1A>

Figure 5:
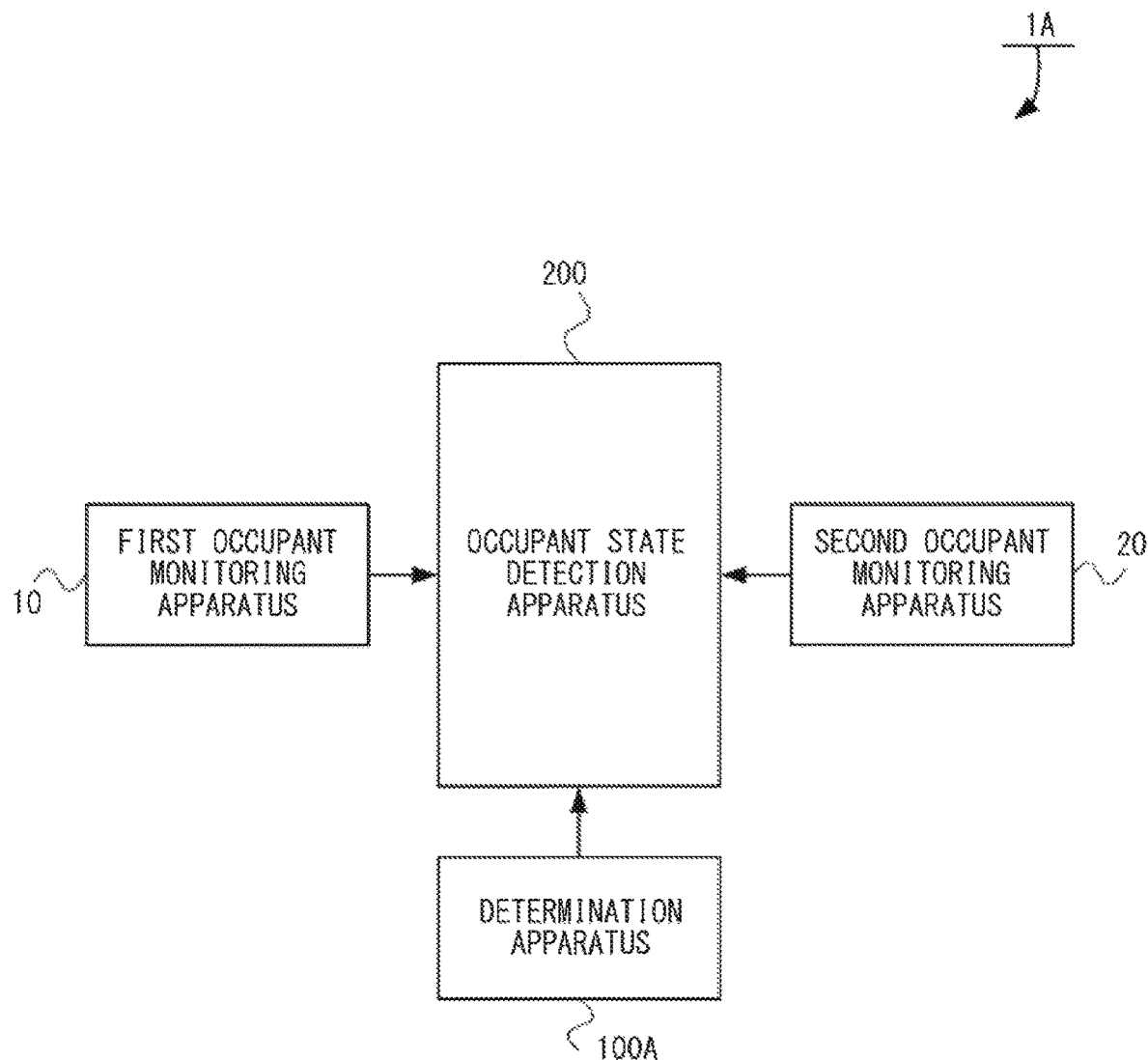
FIG. 5 is a block diagram illustrating a configuration of an occupant state detection system according to a second embodiment of the disclosure.

As illustrated in FIG. 5, the occupant state detection system 1A according to this embodiment may include, without limitation, the first occupant monitoring apparatus 10, the second occupant monitoring apparatus 20, a determination apparatus 100A, and the occupant state detection apparatus 200.

It is to be noted that constituent elements denoted by the same reference characters as those of the first embodiment have similar configurations, and therefore detailed description thereof is omitted.

The determination apparatus 100A is configured to determine whether the vehicle is in the traveling state or the stopped state.

Figure 6:
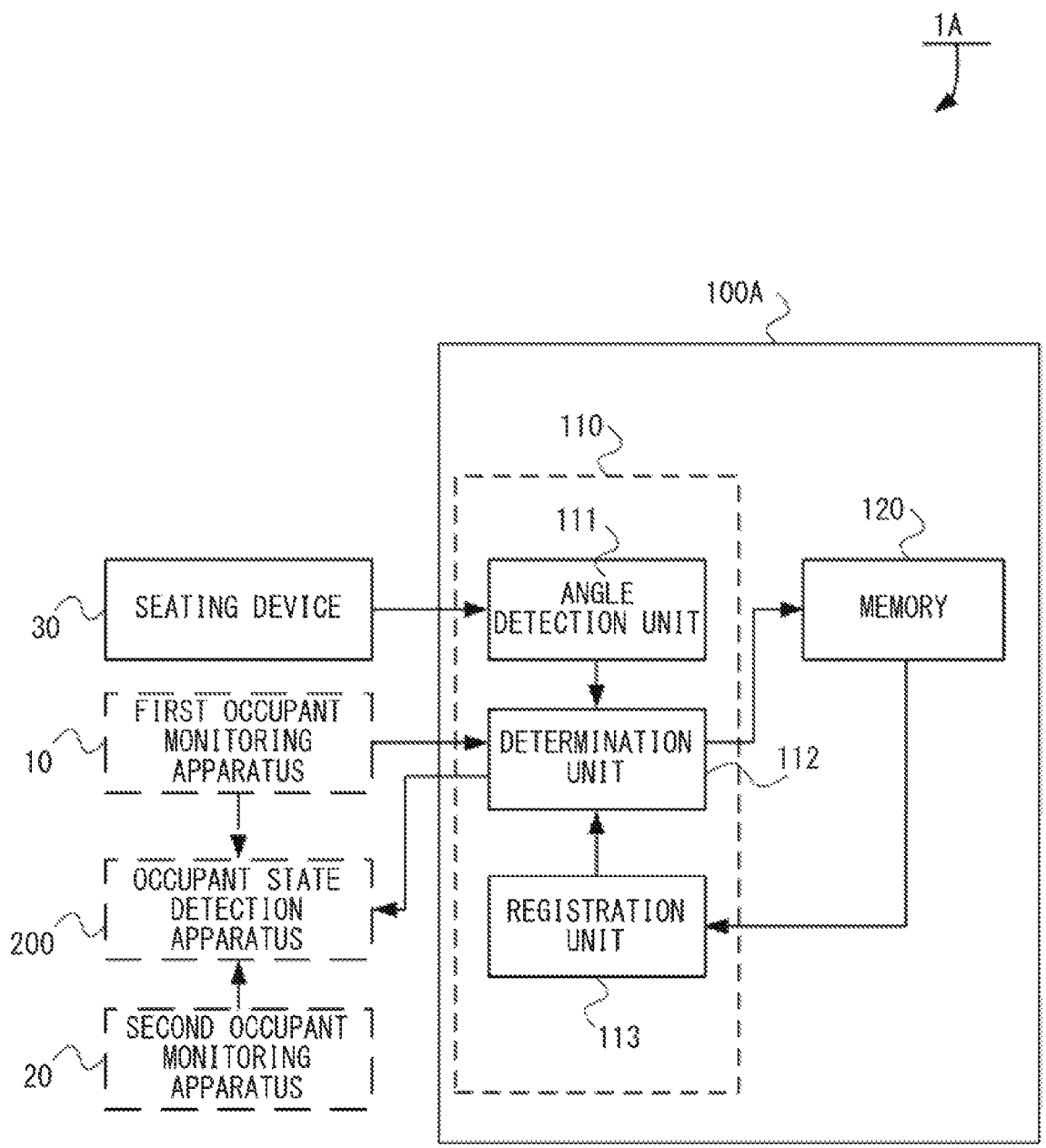
FIG. 6 is a block diagram illustrating a configuration of a determination apparatus in the occupant state detection system according to the second embodiment of the disclosure.

The determination apparatus 100A is configured to detect an angle of a seatback of a seating device 30 (see FIG. 6).

The seating device 30 may be provided in the vehicle and is configured to freely change the angle of the seatback.

The determination apparatus 100A may include, without limitation, a sensor configured to detect the angle of the seatback. In a case where an operation angle of the seatback is equal to or greater than a predetermined angle, the determination apparatus 100A is configured to transmit the data indicating that the vehicle is in the stopped state, to the first processor 210 of the occupant state detection apparatus 200.

The "predetermined angle" may be exemplified by, for example, the operation angle of the seatback with a driver at rest.

The "predetermined angle" is considered to vary with preference of each driver.

As described later, the determination apparatus 100A is configured to register the "predetermined angle" for each driver, on the basis of, for example, the operation angle of the seatback operated by each driver at rest.

It is to be noted that the determination apparatus 100A may further monitor, for example, the vehicle speed pulse and the operation state of the parking brake. On the basis of the vehicle speed pulse and the operation state of the parking brake, together with data from the sensor as mentioned above, the determination apparatus 100A may determine whether the vehicle is in the traveling state or the stopped state.

<Configuration of Determination Apparatus 100A>

As illustrated in FIG. 6, the determination apparatus 100A according to this embodiment may include, without limitation, a second processor 110 and a second memory 120.

The second processor 110 is configured to cooperate with one or more control programs included in the second memory 120 described later, to control an entirety of the determination apparatus 100A.

In this embodiment, for example, the second processor 110 is configured to serve as, for example, an angle detection unit 111, a determination unit 112, and a registration unit 113 described later.

The second memory 120 may include, without limitation, a ROM (Read Only Memory) and/or a RAM (Random Access Memory). The ROM may hold, for example, the control program as mentioned above. The RAM may hold, for example, various data.

In this embodiment, for example, data such as data regarding the operation angle of the seatback operated by an occupant at rest may be held in the RAM.

<Configuration of Second Processor 110>

As illustrated in FIG. 6, the second processor 110 according to this embodiment may include, without limitation, the angle detection unit 111, the determination unit 112, and the registration unit 113.

The angle detection unit 111 may detect the operation angle of the seatback operated by the driver seated on the seating device 30 on the basis of data from, for example, a sensor provided in the seating device 30. The seating device 30 may be provided in the vehicle.

The angle detection unit 111 may transmit operation angle data, i.e., the data regarding the detected operation angle of the seatback, to the determination unit 112 described below.

The determination unit 112 may transmit the data indicating that the vehicle is in the stopped state to the first processor 210, in a case where the determination unit 112 determines that the operation angle of the seatback is equal to or greater than the predetermined angle, on the basis of the operation angle data of the seatback received from the angle detection unit 111.

As the "predetermined angle", data registered in the registration unit 113 described later may be used.

The determination unit 112 may identify the driver on the basis of image data from the first occupant monitoring apparatus 10, and determine whether or not the driver is in a resting state. In a case where the driver is in the resting state and the operation angle received from the angle detection unit 111 is smaller than an angle registered in the registration unit 113 described later, the determination unit 112 may perform processing of storing, in the second memory 120, the operation angle data in association with driver data.

The registration unit 113 may register the operation angle of the seatback operated by each driver at rest, as the predetermined angle for each driver.

In one example, the "predetermined angle" may be a personally registered angle of the seatback.

A case may be taken into consideration in which the personally registered angle of the seatback is adjusted before travel by an occupant of their own volition. In such a case, the registration unit 113 may register whichever is the smallest of the operation angles of the seatback held in the second memory 120 for each driver, as the predetermined angle for each driver. This is intended for detecting the first physical state of the occupant without omission, even if some of the detected physical states include those in the traveling state of the vehicle.

In one example, let us assume a case where each of drivers A to D at rest has operated the seatback at the operation angles as summarized in FIG. 9. In this case, the registration unit 113 may register whichever is the smallest of the operation angles as summarized in FIG. 9, as the predetermined angle for each of the drivers A to D. For example, the registration unit 113 may register 110 degrees as the predetermined angle for the driver A. The registration unit 113 may register 120 degrees as the predetermined angle for the driver B. The registration unit 113 may register 130 degrees as the predetermined angle for the driver C. The registration unit 113 may register 150 degrees as the predetermined angle for the driver D.

In an alternative, the registration unit 113 may register whichever is the greatest of the operation angles of the seatback held in the second memory 120 for each driver, as the predetermined angle for each driver. This is intended for detecting solely the physical state of the occupant at rest, even if some physical states are omitted from the detection.

In one example, let us assume the case where each of drivers A to D at rest has operated the seatback at the operation angles as summarized in FIG. 9. In this case, the registration unit 113 may register whichever is the greatest of the operation angles as summarized in FIG. 9, as the predetermined angle for each of the drivers A to D. For example, the registration unit 113 may register 140 degrees as the predetermined angle for the driver A. The registration unit 113 may register 160 degrees as the predetermined angle for the driver B. The registration unit 113 may register 160 degrees as the predetermined angle for the driver C. The registration unit 113 may register 170 degrees as the predetermined angle for the driver D.

<Processing in Occupant State Detection System 1A>

Figure 7:
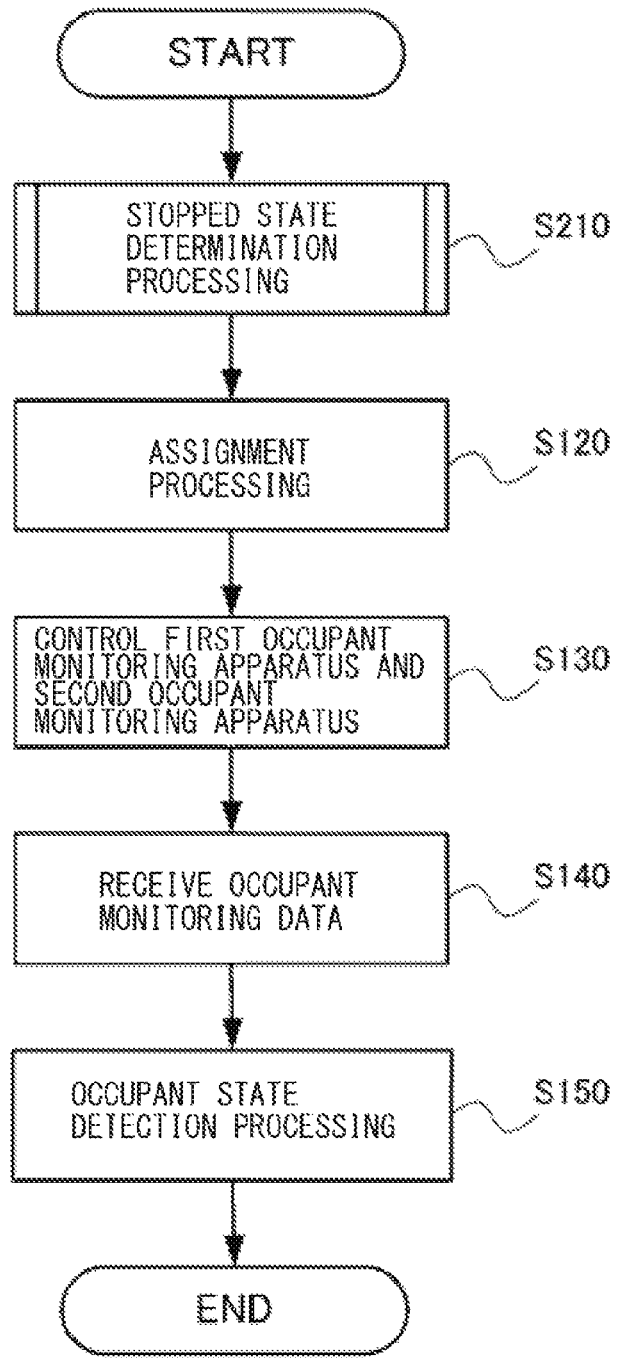
FIG. 7 is a flowchart of processing in the occupant state detection system according to the second embodiment of the disclosure.

Processing in the occupant state detection system 1A according to this embodiment is described with reference to FIG. 7.

The determination unit 112 of the second processor 110 may carry out determination processing as to whether or not the vehicle is in the stopped state (step S210).

It is to be noted that details of the determination processing (step S210) are described later.

In a case where the determination unit 112 of the second processor 110 determines that the vehicle is in the stopped state (step S210), the determination unit 112 may cause the flow to proceed to the assignment processing (step S120).

In the assignment processing (step S120), the monitoring assignment unit 212 may perform processing of making the assignment of the part to be monitored and the data to be acquired, of the occupant in the vehicle, to be detected by the first occupant monitoring apparatus 10 and the second occupant monitoring apparatus 20, and transmitting a signal of such assignment to the first occupant monitoring apparatus 10 and the second occupant monitoring apparatus 20.

After the assignment processing (step S120) in the monitoring assignment unit 212 is carried out, the first processor 210 may permit the first occupant monitoring apparatus 10 and the second occupant monitoring apparatus 20 that have been already started up to output data to the data reception unit 211.

Alternatively, after the assignment processing (step S120) in the monitoring assignment unit 212 is carried out, the first processor 210 may permit the data reception unit 211 to receive the first occupant monitoring data from the first occupant monitoring apparatus 10 and the second occupant monitoring data from the second occupant monitoring apparatus 20.

In another alternative, after the assignment processing (step S120) in the monitoring assignment unit 212 is carried out, the first processor 210 may permit the data reception unit 211 to write, to the first memory 220, the first occupant monitoring data from the first occupant monitoring apparatus 10 and the second occupant monitoring data from the second occupant monitoring apparatus 20.

The data reception unit 211 may receive the first occupant monitoring data from the first occupant monitoring apparatus 10 and the second occupant monitoring data from the second occupant monitoring apparatus 20 (step S140). The first occupant monitoring apparatus 10 and the second occupant monitoring apparatus 20 are provided, by the monitoring assignment unit 212, with the assignment of the part to be monitored and the data to be acquired, of the occupant in the vehicle, to be detected by the first occupant monitoring apparatus 10 and the second occupant monitoring apparatus 20.

The data reception unit 211 may store the first occupant monitoring data received from the first occupant monitoring apparatus 10 and the second occupant monitoring data from the second occupant monitoring apparatus 20, in the first memory 220.

The occupant state detection unit 213 may detect, for example, the physical state of the occupant on the basis of the first occupant monitoring data from the first occupant monitoring apparatus 10 and the second occupant monitoring data from the second occupant monitoring apparatus 20 held in the first memory 220 (step S150).

<Stopped State Determination Processing>

Figure 8:
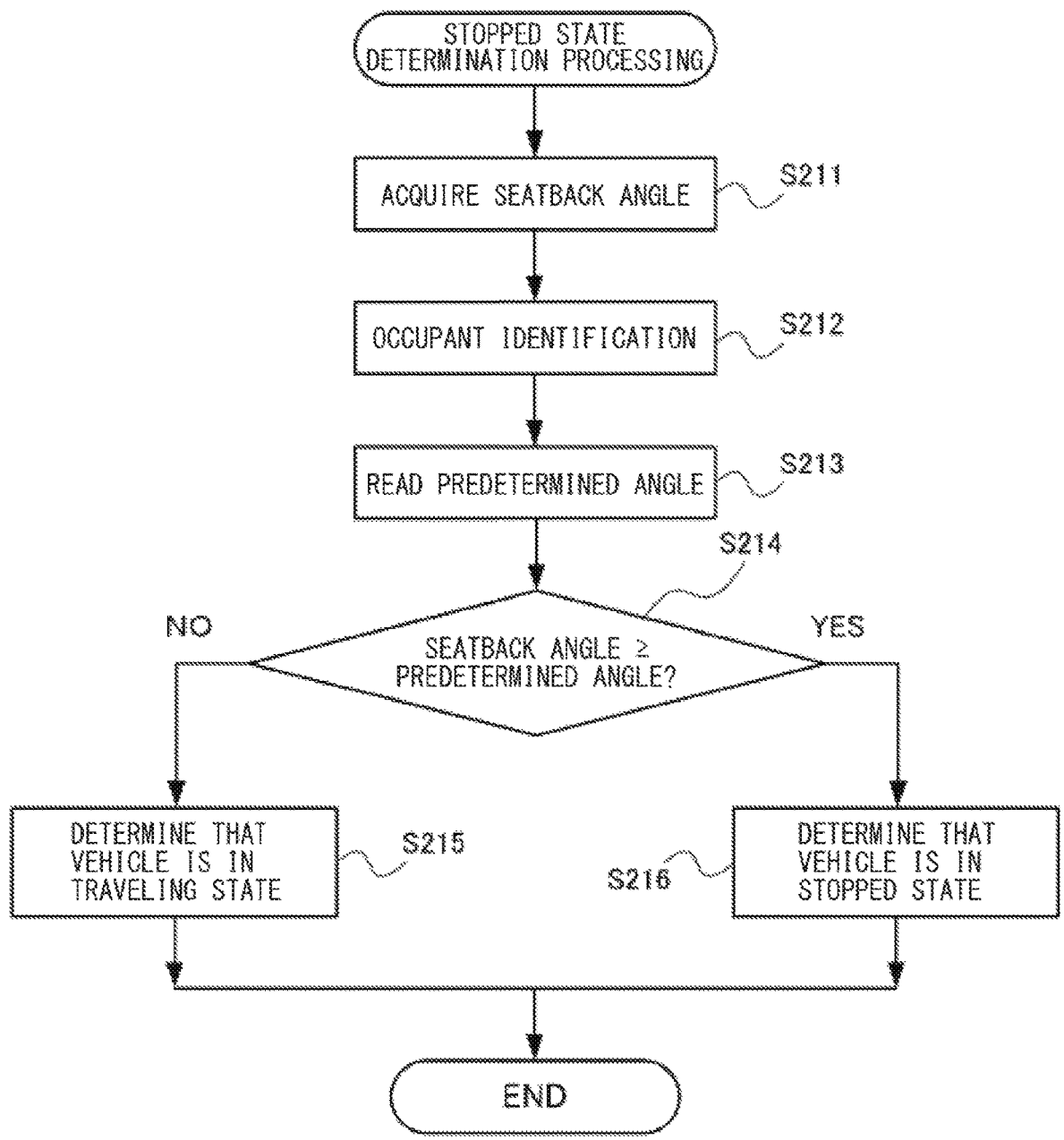
FIG. 8 is a flowchart of processing by the determination apparatus in the occupant state detection system according to the second embodiment of the disclosure.

Processing by the determination unit 112 in the occupant state detection system 1A according to this embodiment is described with reference to FIG. 8.

The angle detection unit 111 of the second processor 110 may acquire the operation angle of the seatback on the basis of the data acquired from the sensor, etc., of the seating device 30 (step S211). The operation angle acquired by the angle detection unit 111 may be outputted to the determination unit 112.

The determination unit 112 may identify the driver on the basis of the image data from the first occupant monitoring apparatus 10 (step S212) and read the predetermined angle corresponding to the driver identified, from the second memory 120 (step S213).

The determination unit 112 may compare the predetermined angle read from the second memory 120 with the operation angle of the seatback acquired from the angle detection unit 111, to determine whether or not the operation angle is equal to or greater than the predetermined angle (step S214).

In a case where the determination unit 112 determines that the operation angle of the seatback is equal to or greater than the predetermined angle ("YES" in step S214), the determination unit 112 may determine that the vehicle is in the stopped state and end the processing.

In a case where the determination unit 112 determines that the operation angle of the seatback is smaller than the predetermined angle ("NO" in step S214), the determination unit 112 may determine that the vehicle is in the traveling state and end the processing.

<Workings and Effects>

As described above, in the occupant state detection system 1A according to this embodiment, the determination apparatus 100A is configured to detect the angle of the seatback of the seating device 30. The seating device 30 may be provided in the vehicle and is configured to freely change the angle of the seatback.

In the case where the angle of the seatback is equal to or greater than the predetermined angle, the determination unit 112 may transmit the data indicating that the vehicle is in the stopped state, to the one or more processors 210.

That is, setting the "predetermined angle" to, for example, the angle of the seatback with the driver at rest makes it possible to easily determine that the vehicle is not in the traveling state but in the stopped state.

This leads to the mutual complementation of the first occupant monitoring apparatus 10 and the second occupant monitoring apparatus 20 in the detection of the state of the occupant in the case where the vehicle is in the stopped state. Hence, it is possible to accurately detect the physical state of the occupant in the stopped state of the vehicle.

Moreover, in the occupant state detection system 1A according to this embodiment, the registration unit 113 of the determination apparatus 100A may register the personally registered angle of the seatback, as the predetermined angle.

Hence, it is possible to determine accurately, for each of the drivers, whether the relevant driver is in the resting state, and whether the vehicle is in the stopped state.

The case may be taken into consideration in which the personally registered angle of the seatback is adjusted before travel by an occupant of their own volition. In such a case, in the occupant state detection system 1A according to this embodiment, the registration unit 113 of the determination apparatus 100A may register whichever is the smallest of the operation angles of the seatback held in the one or more second memories 120 for each driver, as the predetermined angle for each driver.

Registering whichever is the smallest of the operation angles of the seatback for each driver, as the predetermined angle for each deriver, makes it possible to determine accurately almost all the physical states of the occupant at rest, even if some of the detected physical states include those of the occupant not at rest.

Moreover, in the occupant state detection system 1A according to this embodiment, the registration unit 113 of the determination apparatus 100A may register whichever is the greatest of the operation angles of the seatback for each driver held in the one or more second memories 120, as the predetermined angle for each driver.

Registering whichever is the greatest of the operation angles of the seatback for each driver, as the predetermined angle for each deriver, makes it possible to extract solely the physical states of the occupant at rest and determine accurately the physical states of the occupant at rest, even if some physical states of the occupant at rest are omitted from the detection.

Furthermore, in the occupant state detection system 1A according to this embodiment, the determination unit 112 of the determination unit 100A may determine whether or not the driver is in the resting state on the basis of the image of the driver captured by the first occupant monitoring apparatus 10.

That is, the determination unit 112 may determine whether or not the driver is in the resting state on the basis of the image of the face or the behavior of the driver captured by the first occupant monitoring apparatus 10. This makes it possible to determine whether the operation angle of the seatback is equal to or greater than the predetermined angle because the driver is going to take a rest, or whether the operation angle has temporarily become equal to or greater than the predetermined angle simply because of an operation mistake of the driver.

This makes it possible to grasp more clearly whether or not the driver is in the resting state. Hence, it is possible to determine accurately whether the vehicle is in the stopped state.

Third Embodiment

An occupant state detection system 1B according to a third embodiment is described with reference to FIGS. 10 to 13.

<Configuration of Occupant State Detection System 1B>

Figure 10:
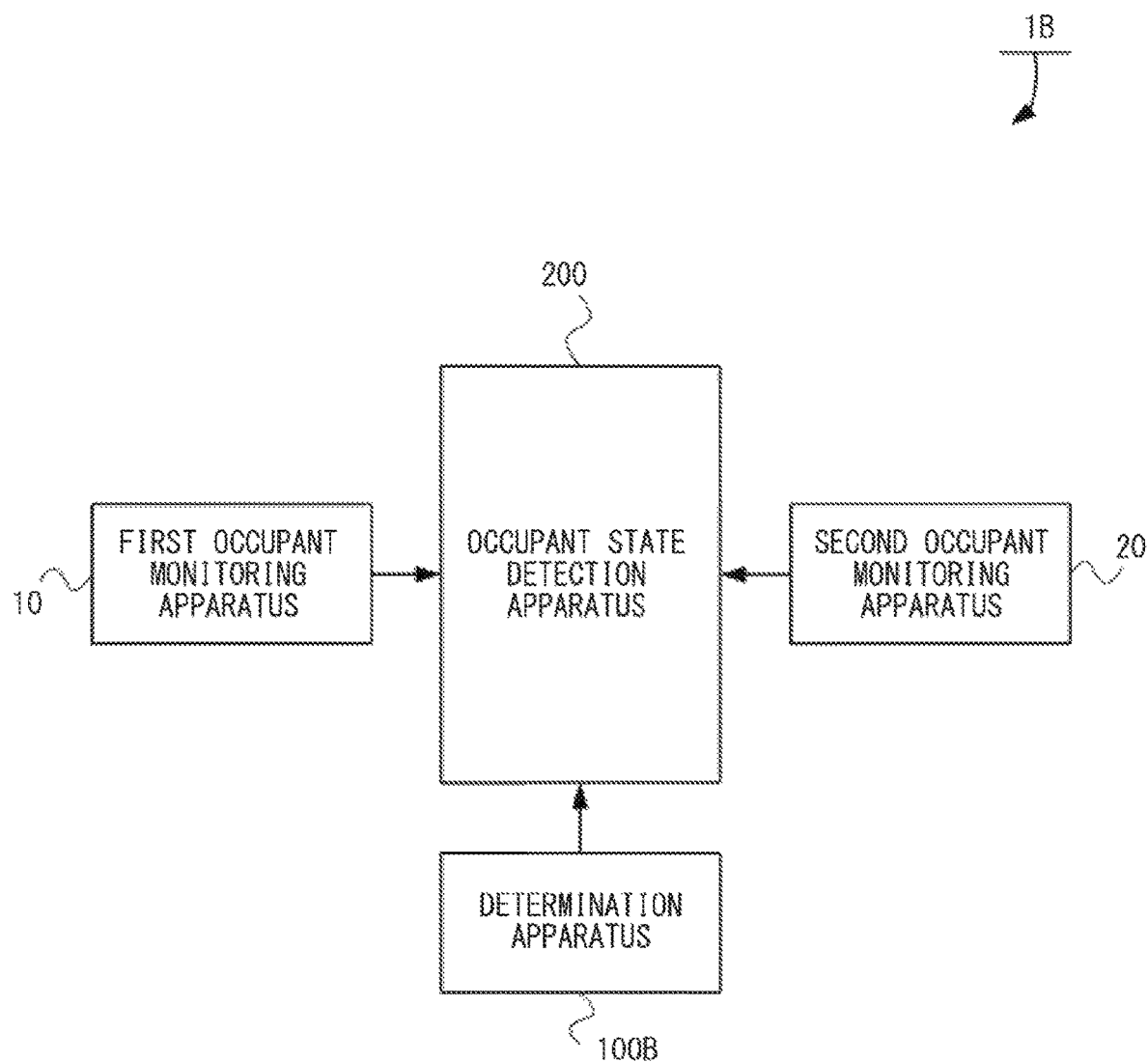
FIG. 10 is a block diagram illustrating a configuration of an occupant state detection system according to a third embodiment of the disclosure.

As illustrated in FIG. 10, the occupant state detection system 1B according to this embodiment may include, without limitation, the first occupant monitoring apparatus 10, the second occupant monitoring apparatus 20, a determination apparatus 100B, and the occupant state detection apparatus 200.

It is to be noted that constituent elements denoted by the same reference characters as those of the first embodiment and the second embodiment have similar configurations, and therefore detailed description thereof is omitted.

The determination apparatus 100B may determine whether the vehicle is in the traveling state or in the stopped state.

For example, the determination apparatus 100B may acquire the image captured by the first occupant monitoring apparatus 10. In a case where an image of the head of the driver has disappeared from within the angle of view of the image acquired, the determination apparatus 100B may determine that the driver has taken a posture with the seatback of the seating device 30 reclined to the predetermined angle or greater.

The determination apparatus 100B may transmit the data indicating that the vehicle is in the stopped state, to the first processor 210.

The determination apparatus 100B may further monitor, for example, the vehicle speed pulse and the operation state of the parking brake. On the basis of the vehicle speed pulse and the operation state of the parking brake together with the data from the sensor as mentioned above, the determination apparatus 100 may determine whether the vehicle is in the traveling state or the stopping state.

<Configuration of Second Processor 210B>

Figure 11:
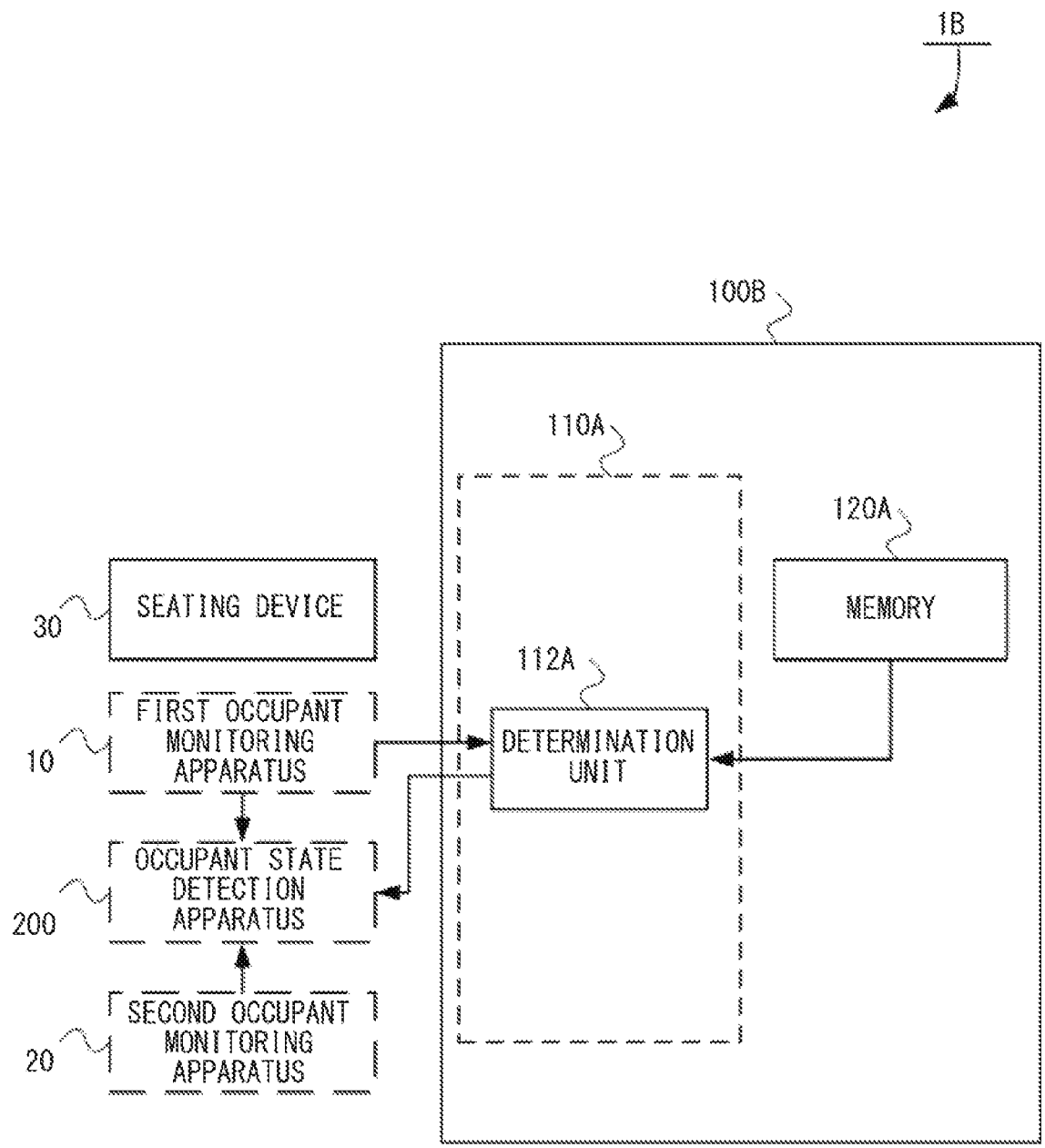
FIG. 11 is a block diagram illustrating a configuration of a determination apparatus in the occupant state detection system according to the third embodiment of the disclosure.

As illustrated in FIG. 11, the determination apparatus 110B may include, without limitation, a second processor 110A and a second memory 120A. The second processor 110A according to this embodiment may include, without limitation, a determination unit 112A. The second memory 120A may have a similar configuration to the second memory 120 of the second embodiment.

The determination unit 112A may acquire the image captured by the first occupant monitoring apparatus 10. In the case where the image of the head of the driver has disappeared from within the angle of view of the image acquired, the determination unit 112A may determine that the driver has taken the posture with the seatback of the seating device 30 reclined to the predetermined angle or greater.

The determination apparatus 100B may transmit the data indicating that the vehicle is in the stopped state, to the first processor 210.

<Processing in Occupant State Detection System 1B>

Figure 12:
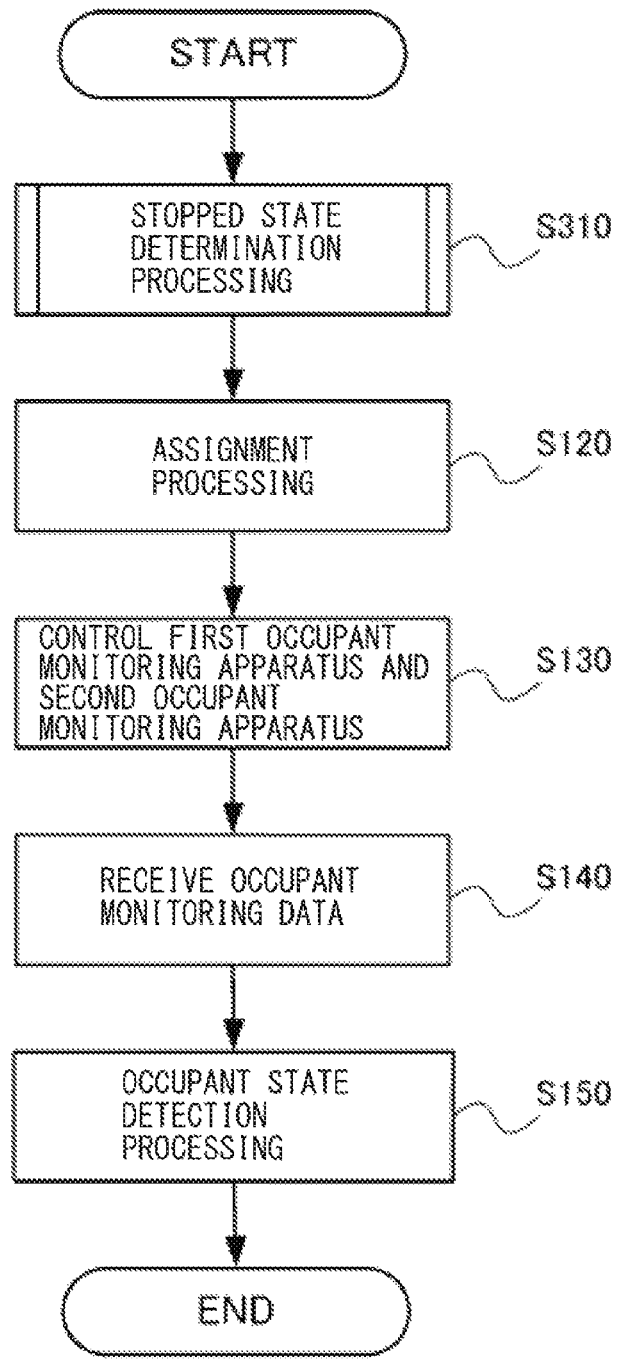
FIG. 12 is a flowchart of processing in the occupant state detection system according to the third embodiment of the disclosure.

Processing in the occupant state detection system 1B according to this embodiment is described with reference to FIG. 12.

The determination unit 112A of the second processor 110A may carry out determination processing as to whether or not the vehicle is in the stopped state (step S310).

It is to be noted that details of the determination processing (step S310) are described later.

In a case where the determination unit 112A of the second processor 110A determines that the vehicle is in the stopped state (step S310), the determination unit 112A may cause the flow to proceed to the assignment processing (step S120).

In the assignment processing (step S120), the monitoring assignment unit 212 may perform processing of making the assignment of the part to be monitored and the data to be acquired, of the occupant in the vehicle, to be detected by the first occupant monitoring apparatus 10 and the second occupant monitoring apparatus 20, and transmitting a signal of such assignment to the first occupant monitoring apparatus 10 and the second occupant monitoring apparatus 20.

After the assignment processing (step S120) in the monitoring assignment unit 212 is carried out, the first processor 210 may permit the first occupant monitoring apparatus 10 and the second occupant monitoring apparatus 20 that have been already started up to output data to the data reception unit 211.

Alternatively, after the assignment processing (step S120) in the monitoring assignment unit 212 is carried out, the first processor 210 may permit the data reception unit 211 to receive the first occupant monitoring data from the first occupant monitoring apparatus 10 and the second occupant monitoring data from the second occupant monitoring apparatus 20.

In another alternative, after the assignment processing (step S120) in the monitoring assignment unit 212 is carried out, the first processor 210 may permit the data reception unit 211 to write, to the first memory 220, the first occupant monitoring data from the first occupant monitoring apparatus 10 and the second occupant monitoring data from the second occupant monitoring apparatus 20.

The data reception unit 211 may receive the first occupant monitoring data from the first occupant monitoring apparatus 10 and the second occupant monitoring data from the second occupant monitoring apparatus 20 (step S140). The first occupant monitoring apparatus 10 and the second occupant monitoring apparatus 20 are provided, by the monitoring assignment unit 212, with the assignment of the part to be monitored and the data to be acquired, of the occupant in the vehicle, to be detected by the first occupant monitoring apparatus 10 and the second occupant monitoring apparatus 20.

The data reception unit 211 may store the first occupant monitoring data received from the first occupant monitoring apparatus 10 and the second occupant monitoring data received from the second occupant monitoring apparatus 20, in the first memory 220.

The occupant state detection unit 213 may detect, for example, the physical state of the occupant on the basis of the first occupant monitoring data from the first occupant monitoring apparatus 10 and the second occupant monitoring data from the second occupant monitoring apparatus 20 held in the first memory 220 (step S150).

<Stopped State Determination Processing>

Figure 13:
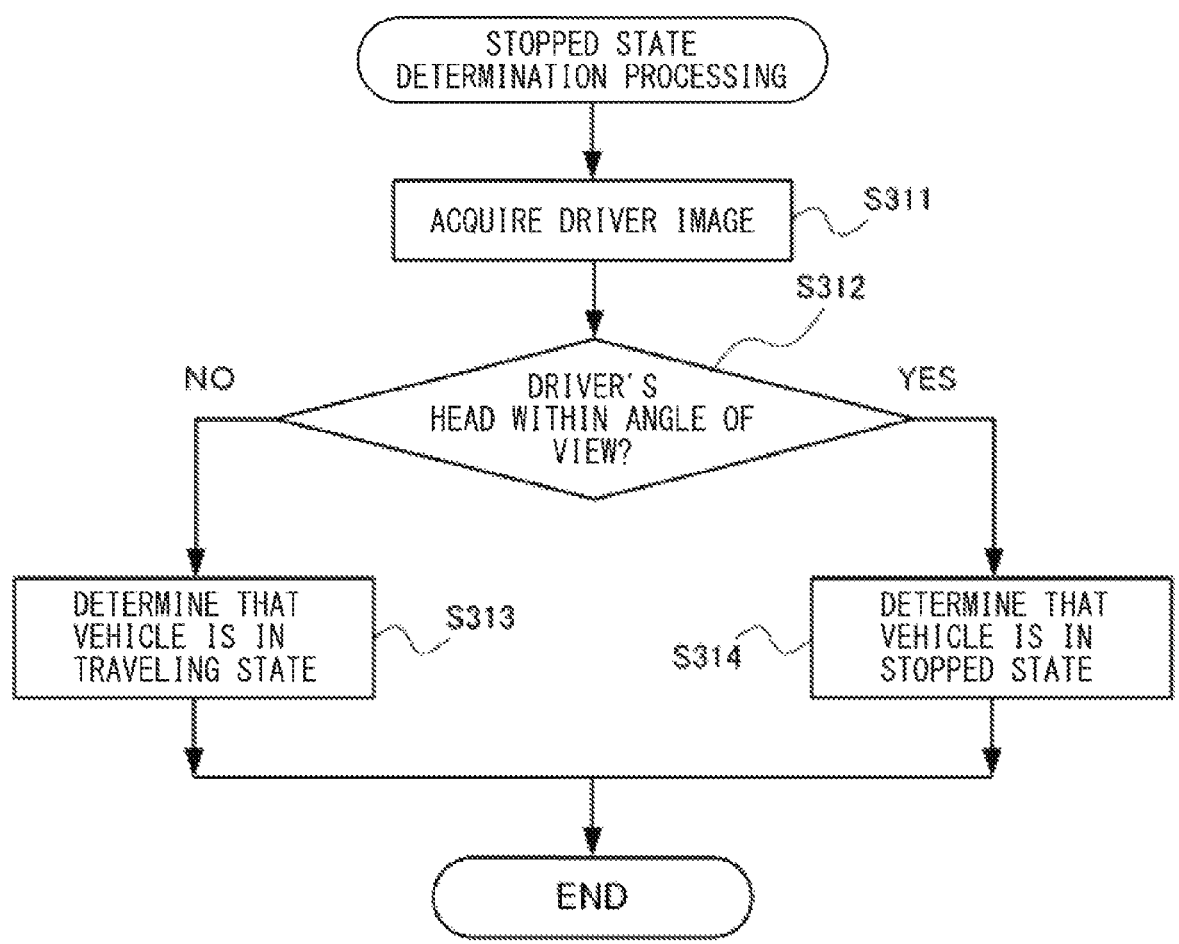
FIG. 13 is a flowchart of processing by the determination apparatus in the occupant state detection system according to the third embodiment of the disclosure.

Processing by the determination unit 112A in the occupant state detection system 1B according to this embodiment is described with reference to FIG. 13.

The determination unit 112A may acquire the image of the head of the driver on the basis of the image data from the first occupant monitoring apparatus 10 (step S311). It is to be noted that the image to be acquired may be an image of an upper half of the body of the driver.

The determination unit 112A may determine presence or absence of the image of the head of the driver in the image data from the first occupant monitoring apparatus 10 (step S312).

In a case where the determination unit 112A determines the presence of the image of the head of the driver in the image data from the first occupant monitoring apparatus 10 ("YES" in step S312), the determination unit 112A may determine that the vehicle is in the stopped state (step S314) and end the processing.

In a case where the determination unit 112A determines the absence of the image of the head of the driver in the image data from the first occupant monitoring apparatus 10 ("NO" in step S312), the determination unit 112A may determine that the vehicle is in the traveling state (step S313) and end the processing.

<Workings and Effects>

As described above, in the occupant state detection system 1B according to this embodiment, the determination apparatus 100B may acquire the image captured by the first occupant monitoring apparatus 10. In the case where the image of the head of the driver has disappeared from within the angle of view of the image, the determination apparatus 100B may determine that the driver has taken the posture with the seatback of the seating device 30 reclined to the predetermined angle or greater. The determination apparatus 100B may transmit the data indicating that the vehicle is in the stopped state, to the first processor 210.

That is, the determination apparatus 100B may acquire the image captured by the first occupant monitoring apparatus 10, and determine whether or not the driver has set the angle of the seatback of the seating device 30 to the predetermined angle or greater, on the basis of the presence or the absence of the image of the head of the driver within the angle of view of the image.

Setting the "predetermined angle" to, for example, the angle of the seatback with the driver at rest makes it possible to easily determine that the vehicle is not in the traveling state but in the stopped state.

This leads to the mutual complementation of the first occupant monitoring apparatus 10 and the second occupant monitoring apparatus 20 in the detection of the state of the occupant in the case where the vehicle is in the stopped state. Hence, it is possible to accurately detect the physical state of the occupant in the stopped state of the vehicle.

It is to be noted that this embodiment is applicable to the second embodiment. In this case, the determination apparatus 100A may transmit the data indicating that the vehicle is in the stopped state, to the first processor 210, in the case where the angle of the seatback is equal to or greater than the predetermined angle, and the image of the head of the driver has disappeared from within the angle of view of the image.

Modification Examples

For example, in the forgoing embodiments, the occupant state detection apparatus 200 may include the monitoring assignment unit 212 and the occupant state detection unit 213. The determination apparatus 100A may include the angle detection unit 111, the determination unit 112, and the registration unit 113. The determination apparatus 100B may include the determination unit 112A. However, an alternative configuration may be possible in which the data from the first occupant monitoring apparatus 10, the second occupant monitoring apparatus 20, and the seating device 30 may be transferred to a server coupled to the vehicle, to allow the server to carry out the processing by the monitoring assignment unit 212, the processing by the occupant state detection unit 213, the processing by the angle detection unit 111, the processing by the determination units 112 and 112A, and the processing by the registration unit 113.

This makes it possible to process many pieces of data quickly. Hence, it is possible to detect accurately, for example, the physical state of the occupant in the stopped state of the vehicle.

Moreover, the forgoing example embodiments give examples of the detection of the state of the occupant. However, the occupant state detection systems 1, 1A, and 1B according to the forgoing example embodiments may further include, without limitation, a visual stimulation device, an auditory stimulation device, a tactile stimulation device, an olfactory stimulation device, a taste stimulation device, or any combination thereof. This makes it possible to alleviate physical fatigue and mental fatigue depending on the state of the occupant when the vehicle is in the stopped state.

The visual stimulation device is one of vehicle devices configured to keep the occupant awake or to induce the occupant's recovery from fatigue. The visual stimulation device may include, without limitation, a light source in the vehicle and an opening and closing mechanism such as a sunroof. Non-limiting examples of the light source may include a light source of an interior light, a meter, an HUD (Head-Up Display), and a monitor.

In one example, during night-time, the visual stimulation device may put on the interior light, or change luminance or chromaticity of the interior light, in response to a control signal from a control processor. During daytime, the visual stimulation device may operate the sunroof, to take an action to take outside light into the cabin.

Thus, providing the occupant state detection systems 1, 1A and 1B with the visual stimulation device makes it possible to keep the occupant awake or to induce the occupant's recovery from fatigue in the case where the vehicle is in the stopped state.

The auditory stimulation device is one of vehicle devices configured to keep the occupant awake or to induce the occupant's recovery from fatigue. The auditory stimulation device may include, without limitation, an on-vehicle acoustic device.

In one example, the auditory stimulation device may output, for example, a warning sound, a warning message, a musical piece, an environmental sound, a prerecorded human voice, a sound that causes an ASMR (Autonomous Sensory Meridian Response).

Thus, providing the occupant state detection systems 1, 1A, and 1B with the auditory stimulation device makes it possible to keep the occupant awake or to induce the occupant's recovery from fatigue in the case where the vehicle is in the stopped state.

The tactile stimulation device is one of vehicle devices configured to keep the occupant awake or to induce the occupant's recovery from fatigue. The tactile stimulation device may include, without limitation, a vibration mechanism that vibrates a seating surface and a back surface of a seat, and a vibration mechanism that vibrates a headrest. The tactile stimulation device may also output an image and/or a sound related to how to give a massage for the recovery from fatigue depending on a body part.

Thus, providing the occupant state detection systems 1, 1A, and 1B with the tactile stimulation device makes it possible to keep the occupant awake or to induce the occupant's recovery from fatigue in the case where the vehicle is in the stopped state.

The olfactory stimulation device is one of vehicle devices configured to keep the occupant awake or to induce the occupant's recovery from fatigue. The olfactory stimulation device may include, without limitation, a fragrance generator. In one example, the olfactory stimulation device may generate, for example, a mint scent or an aroma oil scent that keeps the occupant awake or induces the occupant's recovery from fatigue.

Thus, providing the occupant state detection systems 1, 1A, and 1B with the olfactory stimulation device makes it possible to keep the occupant awake or to induce the occupant's recovery from fatigue in the case where the vehicle is in the stopped state.

In the third embodiment, the example is given in which the determination apparatus 100B may acquire the image captured by the first occupant monitoring apparatus 10, and determine whether or not the driver has set the angle of the seatback of the seating device 30 to the predetermined angle or greater, on the basis of the presence or the absence of the image of the head of the driver within the angle of view of the image. Alternatively, the determination apparatus 100B may measure the time at which the image of the head of the driver has disappeared from within the angle of view of the image.

This makes it possible to determine whether the image of the head of the driver has disappeared from within the angle of view of the image because of the driver reclining the seatback to the predetermined angle or greater to take a rest, or whether the angle of the seatback has become temporarily equal to or greater than the predetermined angle simply because of an operation mistake of the driver.

According to the aspects of the technology, one or more second processors may register whichever is the smallest of operation angles of a seatback held in one or more second memory for each driver, as a predetermined angle for each driver.

According to the aspects of the technology, a first occupant monitoring apparatus may include a camera configured to capture an image of an occupant in a vehicle. The first occupant monitoring apparatus may acquire first occupant monitoring data including behavior, expression, and a posture of the occupant in the vehicle, and transmit the first occupant monitoring data to the one or more processors.

According to the aspects of the technology, the one or more second processors may acquire the image captured by the first occupant monitoring apparatus. In a case where an image of the head of the driver has disappeared from within an angle of view of the image, the one or more second processors may determine that the driver has taken a posture with the seatback of a seating device reclined to the predetermined angle or greater, and transmit data indicating that the vehicle is in a stopped state to one or more first processors.

According to the aspects of the technology, a second occupant monitoring apparatus may include millimeter-wave radar. The second occupant monitoring apparatus may acquire biological data including heartbeat and a brain wave of the occupant in the vehicle, and transmit the biological data to the one or more first processors.

According to the aspects of the technology, two occupant monitoring apparatuses are provided. The mutual complementation of the two occupant monitoring apparatuses in the detection of the state of the occupant in the case where the vehicle is in the stopped state makes it possible to accurately detect the physical state of the occupant including a driver in the stopped state of the vehicle.

The occupant state detection systems 1, 1A, and 1B of the example embodiments of the disclosure may be realized by recording the processing by the first processor 210, and the second processors 110 and 110A in a recording medium readable by a computer system, and by causing the first processor 210, and the second processors 110 and 110A to read and execute a program held in the recording medium. A computer system as used herein includes an operating system and hardware such as peripheral devices.

In the case with the use of the WWW (World Wide Web) system, the "computer system" also includes an environment that provides and/or displays a website.

The program may be transmitted from the computer system in which the program is held in a storage device, etc., to another computer system through a transmission medium or by a transmission wave in the transmission medium.

Here, the "transmission medium" that transmits the program refers to a medium configured to transmit data, e.g., a network (communication network) such as the Internet or a communication line such as a telephone line.

Furthermore, the program as mentioned above may be one that realizes a portion of the processing described above.

In addition, the program may be a so-called differential file, or a differential program, that is able to realize the processing described above by a combination with a program already held in the computer system.

Although some example embodiments of the technology have been described in the forgoing by way of example with reference to the accompanying drawings, the technology is by no means limited to the example embodiments described above. It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

Each of the first processor 210, and the second processors 110 and 110A illustrated in FIGS. 3, 6, and 11 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the first processor 210, and the second processors 110 and 110A illustrated in FIGS. 3, 6, and 11. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the first processor 210, and the second processors 110 and 110A illustrated in FIGS. 3, 6, and 11.

The invention claimed is:

1. An occupant state detection system comprising:
 a first monitor configured to monitor an occupant in a vehicle;
 a second monitor configured to monitor the occupant in the vehicle in a different method from the first monitor;
 one or more processors, and
 one or more memories including one or more programs, when executed, causing the one or more processors to be configured to:
  determine whether the vehicle is in a traveling state or a stopped state;
  in response to determining that the vehicle is in the stopped state, specify first one of body parts of the occupant to be monitored by the first monitor and a first kind of information to be obtained from the first one of the body parts, and specify second one of the body parts of the occupant to be monitored by the second monitor and a second kind of information to be obtained from the second one of the body parts;
  control the first monitor to monitor the first one of the body parts of the occupant to obtain first monitoring data from the first monitor, and the second monitor to monitor the second one of the body parts of the occupant to obtain second monitoring data from the second monitor; and
  determine a physical state of the occupant based on the first kind of information from the first monitoring data and the second kind of information from the second monitoring data,
 wherein the one or more processors is further configured to:
  detect an angle of a seatback of a seating device provided in the vehicle and on which a driver is seated, the seating device being configured to freely change the angle of the seatback; and
  determine that the vehicle is in the stopped state when the seatback is inclined at a predetermined angle or greater.

2. The occupant state detection system according to claim 1, wherein
 the one or more processors are further configured to register, as the predetermined angle for the driver, the angle of the seatback operated by the driver at rest.

3. The occupant state detection system according to claim 2, wherein
   the first monitor is configured to capture an image of the driver, and
   the one or more processors are further configured to determine whether or not the driver is at rest based on the image of the driver captured by the first monitor.

\* \* \* \* \*